United States Patent Office 3,098,708
Patented July 23, 1963

3,098,708
URANIUM OXIDE AND THORIUM OXIDE RECOVERY
Raymond A. Foos, Loveland, and Edgel P. Stambaugh, Montgomery, Ohio, assignors to National Distillers and Chemical Corporation, New York, N.Y., a corporation of Virginia
No Drawing. Filed Aug. 26, 1959, Ser. No. 836,049
11 Claims. (Cl. 23—14.5)

This invention relates to a method for the preparation of finely divided thorium and uranium oxides or hydrates thereof. More particularly, the invention pertains to a new and improved method for recovering thorium and uranium oxides from acidic solutions.

Uranium oxide is currently recovered from its complex ores by a series of chemical operations comprising sulfuric acid leaching of the ores to recover a dilute uranium-containing solution, liquid extraction or ion exchange separation of the uranium from the leach liquors, stripping of the uranium-bearing ion exchange resins or the organic extracts with mineral acids or inorganic salt-containing solutions to recover a solution containing enriched concentrations of uranium. The uranium is then recovered from these acidic solutions either by chemical precipitation with such materials as ammonium hydroxide, aluminum sulfate, magnesium sulfate, sodium hydroxide, etc. or by evaporation of the aqueous material which leaves a residue of uranium salt that is calcined to produce the oxide. The ion exchange or liquid extraction technique yields a uranium concentrate containing from 75 to 95% uranium oxide which can be used as the feed for subsequent liquid-liquid extraction operations. These latter extractions are required to upgrade the uranium material to reactor grade quality. Details of the prior art operations are found in the September 1956 article by R. A. Foos appearing in Mining Engineering and entitled "Hydrometallurgy of Uranium." Another method for reclaiming uranium from low-silica ores and minerals comprises leaching the ores with aqueous sodium carbonate, and precipitation of the uranium by either the addition of sodium hydroxide or by acidification with mineral acids. A further method for recovering uranium from its ores involves the direct treatment of the ores with an organic extractant such as monomethyl orthophosphate. The organic extract containing the uranium is then contacted with a mineral acid, as described above, to transfer the uranium into the aqueous phase. Precipitation by chemical means is then carried out. Table I shows typical analyses of two uranium minerals, i.e. carnotite and pyrochlore, and the uranium concentrate which is recovered by the ion exchange or liquid extraction methods. It will be seen from the data that large quantities of metallic impurities occur with the uranium.

Thorium occurs mainly in monazite sand as a complex phosphate contaminated with yttrium, lanthanide elements, iron, calcium, alkali and alkaline earth metal oxides, and trace quantities of uranium. A typical analysis is given in Table I. The ore is generally opened by either a sodium hydroxide or concentrated sulfuric acid treatment. In the former method, the sodium phosphate dissolves and the residue is a concentrate of thorium, lanthanide elements, yttrium and various impurities. This concentrate is then dissolved in acid and treated by a variety of methods such as chemical precipitation, ion exchange or liquid-liquid extraction to selectively separate the thorium from the lanthanide elements and yttrium. Sulfuric acid breakdown of the monazite sand requires an acid to ore ratio of 2:1, reaction times of three to four hours, and a reaction temperature of about 200° C. Aqueous leaching of the resulting mass gives dissolution of greater than 95% of the uranium, thorium, yttrium, and lanthanide elements as well as numerous impurities. Attempts to separate these elements by careful and controlled addition of homogeneous precipitating agents, such as ammonia, urea or hexamethylenetetraamine, have only been moderately successful. These systems have not proven to be commercially feasible because of the high reagent costs and precise controls which are required.

Extensive work has also been carried out on the use of ion exchange and liquid-liquid extraction methods to separate thorium from the lanthanide elements and other impurities. It has been found that in a nitric acid system, for example, solvents such as tributyl phosphate will preferentially extract the thorium at controlled conditions of acidity and flow ratios. The organic extract is stripped with a dilute acid solution, which may contain inorganic salts, in a multistage process to recover the thorium. Thorium oxide is then precipitated from this solution by addition of oxalic acid or ammonium hydroxide followed by calcination. The above-described methods for the recovery of thorium from its ores are time consuming, result in low yields, and are expensive.

TABLE I

Analysis of Thorium and Uranium Source Material

| Composition | Monazite, percent | Carnotite, percent | Pyrochlore, percent | Uranium concentrate, percent |
|---|---|---|---|---|
| $ThO_2$ | 5-10 | | 0-5.0 | 0-2 |
| $Y_2O_3$ | 0-2 | trace | 0-2.0 | trace |
| Lanthanide Elements (At. Nos. 57-71) | 30-60 | trace | 0-4.0 | 0-5 |
| $P_2O_5$ | 20-30 | trace | 0-2.0 | 1-3 |
| $Fe_2O_3$ | 3-10 | 0.1-1.0 | 3.5 | 1-5 |
| $SiO_2$ | 2-10 | trace | 1.6 | 0-3 |
| $CaO$ | 3-10 | 0.5-1.0 | 13 | 0-10 |
| $Al_2O_3$ | 1-5 | trace | 0-2.0 | 0-10 |
| $U_3O_8$ | 0.1-0.5 | 40-60 | 12 | 75 |
| $V_2O_5$ | 0-4.0 | 15-25 | 0-2.0 | 0-5 |
| $Cu$ | 0-0.2 | trace | trace | trace |
| $Na_2O$ | 0-5 | 0.1-0.5 | 0-5 | 0-10 |
| $MgO$ | 0-3 | 0.2-0.5 | 0.40 | 0-10 |
| $TiO_2$ | 0-2 | trace | 11.4 | 0-2 |
| $Cb_2O_5$ | | | 31.0 | |
| $Ta_2O_5$ | | | 10.3 | |
| $K_2O$ | | 5-10 | 0-1.0 | |

One object of the present invention is to provide a method of recovering finely divided thorium and/or uranium oxides or hydrates thereof which avoid disadvantages in the prior art processes. Another object of the invention is to provide a method of recovering the metal oxides or hydrates from acidic solutions without the use of precipitants. A further object of the invention is to separate uranium and/or thorium oxides from lanthanide elements. A still furher object of the invention is to prepare thorium oxide and/or uranium oxide having a much lower content of aluminum, iron, magnesium, nickel, lead, etc. than present in the metal feed material. Other objects will become apparent from the ensuing description of the invention.

In accordance with the present invention, it has now been found that finely divided purified uranium oxide and/or thorium oxide can be prepared from aqueous acidic solutions thereof. In general, the process involves heating the uranium or thorium-containing feed solutions ot temperatures of above about 170° C., preferably about 200° to 250° C., and under a superatmospheric pressure of at least 100 p.s.i. and preferably about 200 to 400 p.s.i. This treatment is continued for about 2 to 60 minutes, generally about 5 to 10 minutes, which does not include the time required to heat this solution from room temperature to the treatment temperature. In the preferred method of operation, the solution undergoing the aforementioned treatment is subjected to continuous agitation or stirring to promote a faster reaction and a more finely divided product. The resulting uranium oxide and/or thorium oxide hydrate precipitate from the solution and have an average particle size in the range of about 0.5 to 20 microns and usually about 1 to 5 microns. After the pressure has been released, the resulting slurry is filtered to recover the finely divided solid hydrate of uranium oxide and/or thorium oxide. If the feed solution contains impurities such as aluminum, iron, magnesium, nickel, cobalt, lead, etc., the uranium and/or thorium product was found to have a markedly lower content of these metallic impurities. In addition, it was found that yttrium and lanthanide elements do not precipitate. It is apparent, therefore, that a direct and simple separation of thorium and/or uranium from lanthanide elements is effected by this process. Consequently, the expensive and time consuming liquid-liquid extraction separation of thorium from lanthanide elements as well as the chemical precipitation steps are not required in the inventive process.

The uranium and/or thorium-containing acid solutions useful as feed material in the present invention may be derived from any source. These feed solutions are usually obtained from the processing of uranium and thorium ores, concentrates or chemical compounds such as sulfates, oxides, chlorides, acetates, etc. The uranium and/or thorium solutions can also be obtained by stripping the aforementioned organic extracts with mineral acids, such as hydrochloric, nitric, sulfuric or mixtures thereof or by treatment of ion exchange resins containing uranium and/or thorium with dilute mineral acids or inorganic salt solutions. It is also apparent that impure uranium concentrates can be dissolved in mineral acid solutions and recovered therefrom by the inventive process. The acid feed solutions may also contain certain organic acids such as acetic, formic or other mineral acids such as hydrobromic acid, hydroiodic acid, thiocyanic acid, etc. or mixtures thereof. The concentration of uranium and/or thorium oxides in the feed solution may range from about 3 to 250 grams per liter, preferably about 15 to 75 grams per liter. Solutions containing about 100 grams per liter of uranium oxide can be obtained, for example, by stripping a uranium-containing organic solution composed of di-2-ethylhexyl phosphoric acid in kerosene with 6 to 12 normal hydrochloric acid. A solution containing about 80 grams per liter of thorium oxide can be obtained by treating thorium hydroxide with hydrochloric acid. The acid concentration, calculated as the total titratable acid and including both free and combined acids, will be about 5 to 150 grams per liter and preferably below about 75 grams per liter. It was further found that after the prescribed treatment the acid concentration in the filtrate should not exceed about 15% in order to insure high yields. At higher acid concentrations in the filtrate the reaction tends to reverse and give partial dissolution of the precipitated hydrate. Consequently, low acid concentrations in the filtrate and in the feed solution are preferred to achieve maximum yields. The feed need only contain sufficient amounts of water necessary to effect the desired hydrolysis reaction.

In accordance with another embodiment of this invention, solid materials such as carbon, calcium sulfate, silicon dioxide, titanium dioxide, barium sulfate, etc. are added to the feed solution prior to the hydrolysis treatment. By utilizing this feature, it is possible to prepare heterogeneous mixtures of finely divided precipitated uranium and/or thorium oxides containing the additive material. The thorium and/or uranium oxide-carbon mixtures obtained by this method can be used in the preparation of high purity thorium and/or uranium chlorides. The uranium oxide-additive mixture prepared by this method would have utility as a component in ceramic tiles, paints, catalysts, etc. The amount of additive material employed can obviously vary over a wide range. This aspect of the invention will be more fully illustrated below.

Any conventional type pressure kettle or vessel such as a Parr autoclave provided with agitation means, if desired, can be employed in carrying out the process of this invention. The process can be continuous or batchwise, and the dissolution and precipitation steps can be carried out in the same vessel. After the heat treatment under pressure has been completed, the pressure is released and the resulting mixture or slurry is filtered. The filter cake will contain the finely divided uranium and/or thorium oxide hydrates and additive material, if employed. In general, it is preferred to filter the mixture while it is still hot, i.e., at a temperature of about 60° to 90° C., to eliminate any tendency for peptization. The filter cake, if the filtrate contains metallic impurities, is generally washed with water or an acid solution. An illustrative acid solution is 10% hydrochloric acid. Other mineral acids which may be employed for this purpose include sulfuric, nitric, and mixtures thereof. If anhydrous or dehydrated metal oxides are desired, calcination by any of the standard methods can be utilized. As noted above, the method of this invention results in the preparation of high quality and finely divided uranium oxide and/or thorium oxide. The quality and fine state of subdivision of the products make them particularly desirable for many of the known uses. The oxides can also be reduced with calcium to produce the corresponding metals. Uranium oxide having this quality can be used as a superior grade component in ceramic tiles for the generation of a red color. Both thorium and uranium oxides have catalytic applications.

The following examples will serve to illustrate the practice of this invention.

EXAMPLE I

A solution containing 81.0 grams per liter of thorium oxide and 58 grams per liter of titratable HCl was prepared by dissolving thorium tetrachloride in water followed by filtration to remove any of the insoluble materials. The solution was placed in a Parr autoclave equipped with agitator means and heated at 180° C. and 150 p.s.i. for 60 minutes. Upon termination of this treatment, the resulting slurry was cooled to 70° to 80° C., the pressure released, and the slurry filtered while hot. Calcination of the filter cake at 600° to 800° C. yielded anhydrous thorium oxide having a particle size range of about 1 to 20 microns. The yield was 21% by weight based on the amount of thorium in the feed material.

EXAMPLE II

A solution containing 49 grams per liter of thorium oxide and 13.5 grams per liter of titratable HCl was treated in a Parr autoclave at 200° C. and 200 p.s.i. for 120 minutes. Upon cooling of the reaction product, the slurry was recovered and treated as in Example I. The recovery of thorium oxide was 84.2% by weight.

EXAMPLE III

A solution containing 81.3 grams per liter of uranium oxide and 54.4 grams per liter of titratable $H_2SO_4$ was prepared by dissolving uranium hydroxide in $H_2SO_4$. Insoluble material was removed by filtration. The filtrate was heated at 225° C. and 400 p.s.i. for 60 minutes in a Parr autoclave. The resulting reaction product was cooled to 70° to 80° C., filtered, and washed with 10% HCl. Calcination of the uranium oxide hydrate at 600° to 800° C. produced anhydrous uranium oxide in a yield of 28.4% by weight.

EXAMPLE IV

A solution containing 98.4 grams per liter of uranium oxide and 46.6 grams per liter of HCl was prepared as in Example III with the exception that HCl was used in place of $H_2SO_4$. Treatment of this solution at 225° C. and 400 p.s.i. for 60 minutes followed by calcination of the uranium oxide hydrate product gave a uranium oxide recovery of 17.6% by weight.

EXAMPLE V

The conditions of Example IV were repeated except that the HCl concentration is reduced to 15 grams per liter by addition of caustic. A yield of 80% by weight of the uranium, as uranium oxide, results from this experiment.

EXAMPLE VI

Run A: A solution containing 100 grams per liter of yttrium and lanthanide chlorides, comprising cerium, lanthanum, neodymium, praseodymium, gadolinium, etc. was prepared by direct dissolution of the chloride mixture in water followed by filtration. The titratable HCl concentration of this solution was about 60 grams per liter. Treatment of the solution in a Parr autoclave at 200° C. and 200 p.s.i. for 30 minutes yielded no precipitate.

Run B: A solution containing 400 grams per liter of lanthanide chlorides prepared as in run A was heated at 225° C. and 315 p.s.i. for 60 minutes. No precipitation of lanthanide oxides occurred.

Run C: A solution containing 20 grams per liter of lanthanide chlorides, 50 grams per liter of thorium oxide and 20 grams per liter of titratable HCl is heated at 200° C. and 200 p.s.i. for 20 minutes. The slurry is treated as described in Example I. Analysis of the resulting calcined thorium oxide precipitate revealed that it contains less than 1.0 percent lanthanides.

EXAMPLE VII

The conditions of Example II were repeated after addition of 10 grams of carbon to the solution prior to treatment in the autoclave. A heterogeneous mixture of thorium oxide-carbon resulted upon filtration of the slurry.

EXAMPLE VIII

A uranium concentrate having the analysis shown below is dissolved in $H_2SO_4$ to give a solution containing 60 grams per liter of uranium oxide and 30 grams per liter of $H_2SO_4$. Treatment of this solution at 210° C. for 30 minutes gives an oxide product with an analysis shown below. From the data, it is apparent that many impurities can be separated from uranium by this method.

TABLE II

| Component | Uranium concentrate, percent | Uranium oxide product, percent |
|---|---|---|
| $U_3O_8$ | 80.0 | >98 |
| $Fe_2O_3$ | 4.2 | <0.2 |
| CaO | 1.2 | <0.1 |
| $Al_2O_3$ | 1.7 | <0.05 |
| $Na_2O$ | 2.0 | <0.02 |
| MgO | 1.4 | <0.05 |
| NiO | 0.2 | <0.02 |
| MnO | 0.2 | <0.05 |

While particular embodiments of this invention are shown above, it will be understood that the invention is obviously subject to variations and modifications without departing from its broader aspects. For example, the liquid recovered from the filtration steps can be advantageously recycled to the dissolution step or to the organic extracting step with or without a clean up treatment depending upon the amount of impurities present. The ability to reuse these streams to recover solubilized uranium oxide and/or thorium oxide values without intermediate chemical treatment is obviously another advantage of the inventive process. Under such conditions of recycle the yields of thorium oxide and uranium oxide will approach quantitative amounts. The term "lanthanide elements" as used throughout the specification and claims means those elements having atomic numbers from 57 to 71, inclusive.

What is claimed is:

1. A process for preparing purified oxides of a metal selected from the group consisting of thorium, uranium, and mixtures thereof from an impure feed solution comprising said metal and metallic impurities including lanthanide elements which comprises (1) heating for less than about 120 minutes an aqueous acidic solution of said metal containing said metallic impurities, said solution having an acid concentration of about 5 to 150 grams per liter, at a temperature between about 170° and 250° C. and at a pressure above about 100 p.s.i. to precipitate said metal oxides in purified form, (2) releasing said pressure, and (3) recovering said precipitated purified metal oxides from said impure feed solution containing lanthanide elements.

2. The process of claim 1 wherein the temperature is within the range of about 200° to 250° C. and the pressure is within the range of about 200 to 400 p.s.i.

3. The process of claim 1 wherein said solution has an acid concentration between about 5 and 75 grams per liter.

4. The process of claim 1 wherein said metal is thorium.

5. The process of claim 1 wherein said metal is uranium.

6. The process of claim 1 wherein said solution contains an acid selected from the group consisting of hydrochloric, sulfuric, nitric, hydrobromic, hydroiodic, thiocyanic, acetic, formic, and mixtures thereof.

7. The process of claim 6 wherein said acid is hydrochloric.

8. The process of claim 6 wherein said acid is sulfuric.

9. The process of claim 1 wherein said solution contains an inert solid material and said precipitated metal oxides are recovered in admixture with said solid material.

10. The process of claim 9 wherein said solid material is selected from the group consisting of carbon, calcium sulfate, silicon dioxide, titanium dioxide, and barium sulfate.

11. The process of claim 10 wherein said solid material is carbon.

References Cited in the file of this patent
UNITED STATES PATENTS
2,905,528   Johnson _____ Sept. 22, 1959

OTHER REFERENCES
Kitzes, Proceedings of the International Conference on the Peaceful Uses of Atomic Energy, Aug. 8–20, 1955, vol. 9, pages 414–422, United Nations, New York.